Figure 2:
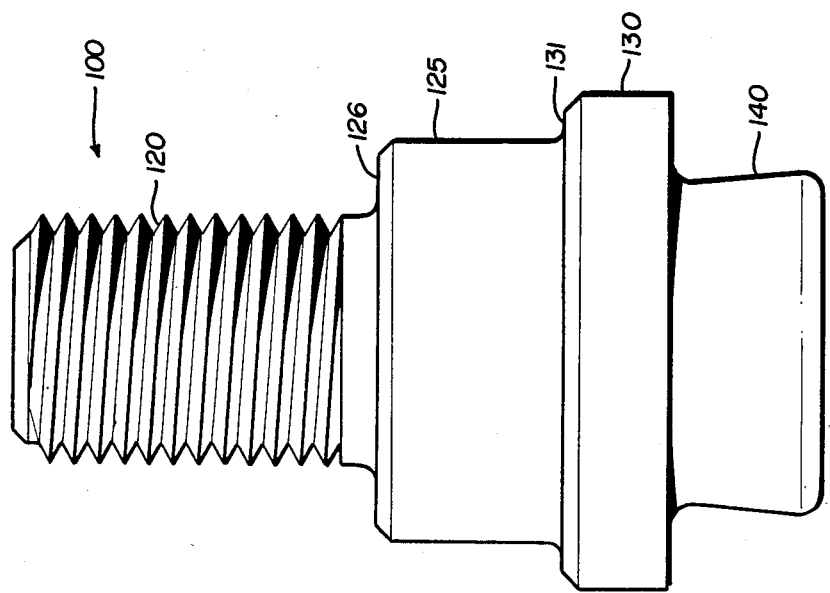

United States Patent [19]

Müller

[11] Patent Number: 4,543,701

[45] Date of Patent: Oct. 1, 1985

[54] METHOD OF ATTACHING A FASTENER TO A PANEL

[75] Inventor: Rudolf R. M. Müller, Frankfurt, Fed. Rep. of Germany

[73] Assignee: Multifastener Corporation, Southfield, Mich.

[21] Appl. No.: 504,074

[22] Filed: Jun. 14, 1983

Related U.S. Application Data

[63] Continuation of Ser. No. 229,274, Jan. 29, 1981, abandoned.

[30] Foreign Application Priority Data

Feb. 2, 1980 [DE] Fed. Rep. of Germany ....... 3003908

[51] Int. Cl.$^4$ ............................................ B23P 11/00
[52] U.S. Cl. ..................... 29/432.1; 29/512; 29/793; 29/243.52; 227/55; 403/242; 403/283; 411/107; 411/179; 411/386
[58] Field of Search ................. 29/432, 432.1, 432.2, 29/512, 793, 243.52; 411/107, 179, 386, 499; 227/51, 55, 59; 403/242, 283

[56] References Cited

U.S. PATENT DOCUMENTS

| | | | |
|---|---|---|---|
| 2,053,490 | 9/1936 | Novick | 29/432.2 |
| 3,095,777 | 7/1963 | Hallock | 29/432 X |
| 3,393,724 | 7/1968 | Joffe | 29/432 X |
| 3,432,925 | 3/1969 | Woolley | 29/512 X |
| 3,579,802 | 5/1971 | Gajouski | 29/432.2 |
| 3,602,974 | 9/1971 | Koett | 29/432.1 X |
| 3,754,731 | 8/1973 | Mackal et al. | 29/512 X |
| 3,800,401 | 4/1974 | Jesevich et al. | 29/512 X |
| 3,871,264 | 3/1975 | Hallock | 411/499 |
| 3,938,239 | 2/1976 | Lauth | 29/512 |
| 4,004,483 | 1/1977 | Hallock | 411/386 |
| 4,018,257 | 4/1977 | Jack | 29/512 |
| 4,039,099 | 8/1977 | Boxall | 29/243.52 X |
| 4,064,617 | 12/1977 | Oaks | 29/432.1 |
| 4,193,333 | 3/1980 | Hallock | 29/432.1 UX |
| 4,281,446 | 8/1981 | Umeno | 29/432.1 |

FOREIGN PATENT DOCUMENTS

| | | |
|---|---|---|
| 2013713 | 10/1971 | Fed. Rep. of Germany . |
| 2446888 | 1/1976 | Fed. Rep. of Germany . |
| 2026040 | 9/1970 | France . |
| 321478 | 11/1929 | United Kingdom ............... 29/432.1 |
| 676739 | 7/1952 | United Kingdom ............... 29/432 |
| 1468150 | 3/1977 | United Kingdom ............... 29/432 |
| 1471666 | 4/1977 | United Kingdom ............... 29/432 |

*Primary Examiner*—Charlie T. Moon
*Attorney, Agent, or Firm*—Cullen, Sloman, Cantor, Grauer, Scott & Rutherford

[57] ABSTRACT

A method of attaching a metal fastener, such as a stud-bolt, to a panel. The fastener includes a self-piercing annular projecting wall defining a recess having a bottom wall and an inner side wall defined by the annular wall. The method includes locating the fastener adjacent a panel with the self-piercing end portion facing the panel opposite a die member. The fastener is then forced toward the die member, such that the annular wall pierces a slug from the panel into the central recess and against the bottom wall. The die member simultaneously deforms the distal end of the annular wall outwardly and the pierced panel edge is deformed from the plane of the panel against the external surface of the annular wall, interlocking the panel and fastener.

17 Claims, 6 Drawing Figures

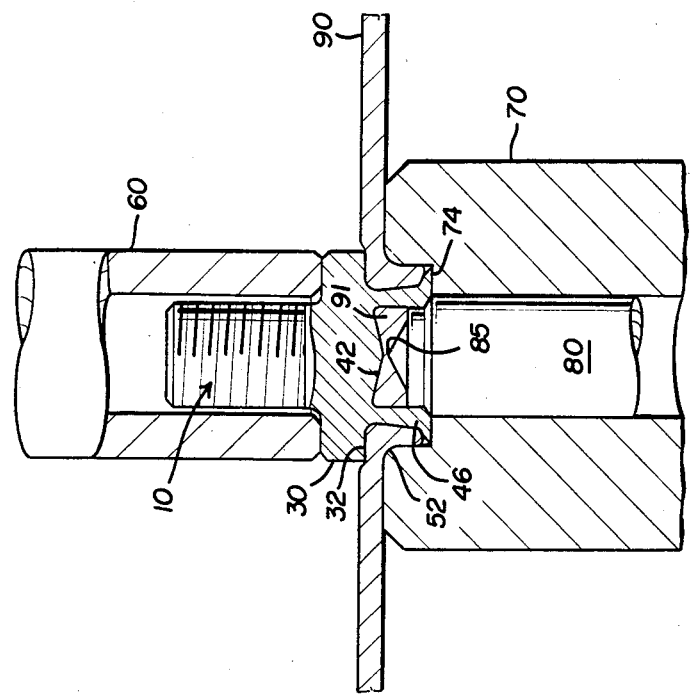
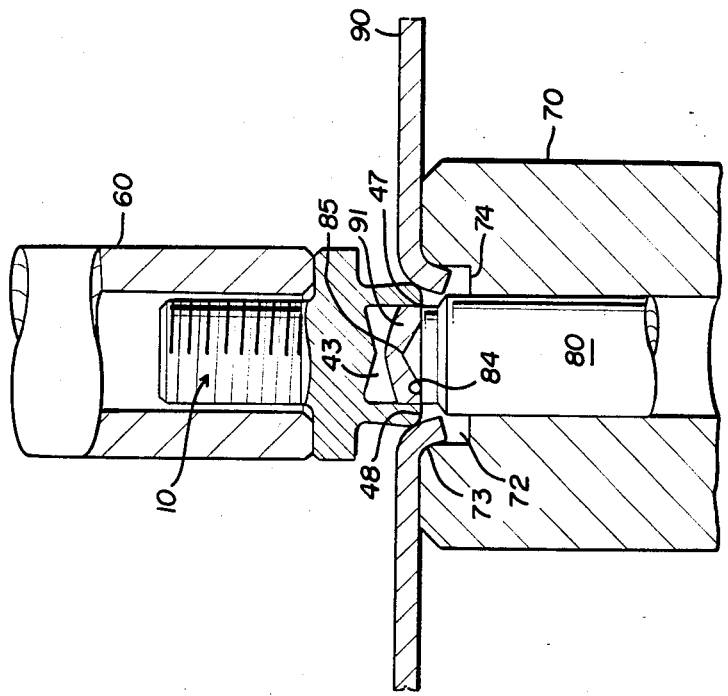

METHOD OF ATTACHING A FASTENER TO A PANEL

This application is a continuation application of my U.S. patent application, Ser. No. 229,274, filed Jan. 29, 1981, now abandoned.

This invention relates to a stud bolt, the substantially cylindrical body of which consists of a shank, optionally furnished with thread, and of a head at one end of the shank. The invention relates also to an apparatus and to a method for fixing stud bolts of this type to metal sheets, plates, panels and the like.

Known stud bolts of the said type are fitted to metal sheets, plates or panels—hereinafter only "panels" will be referred to—, by the stud bolt being weldingly pressed with its head end onto one side of the panel and thus fixed. Furthermore, stud bolts furnished with a head are known, which can be inserted into a panel. These stud bolts are guided through an opening in a preperforated panel and riveted in the region of the head end to the panel. Where these stud bolts are used, considerable assembly difficulties are encountered in respect both of the vertical alignment of the stud bolt to the panel and also the strength to be achieved by the riveted connection. Since this stud bolt moreover can be fitted only into an opening on preperforated panels, at least two operations are necessary for their fixing, namely the preperforation of the panel and the insertion of the stud bolts into this panel. Nevertheless, this riveted fixing of the stud bolts is preferred to the fixing by welding on, since especially in mass production complicated and expensive automatic welding machines can be used only for one moulding each. Moreover, structural changes in the panel material are produced by the local heating during the welding operation.

The task underlying the present invention is to create a stud bolt which makes possible forms of construction which lead to savings, especially in the work sequence in the fixing of the stud bolt to a panel.

On the basis of the general concept of this invention, of imparting to the stud bolt itself riveting performance, this task is achieved in that a piercing portion is disposed at one end of the stud bolt. The piercing portion can be formed at the head end of the stud bolt, preferably on a bearing surface of the head that faces away from the shank, so that after the stud bolt has been inserted into a panel the shank projects out beyond one face of the panel. By the invention the special advantage is obtained that the stud bolt according to this invention can be inserted self-piercingly into the panel, i.e. one operation, namely the preperforation, can be omitted.

If, in a further embodiment of the invention, the piercing portion consists of a coaxial recess and of a riveting wall surrounding the recess, then one end edge of the riveting wall, preferably the end edge nearest to the recess, can be formed as a cutting edge.

Preferably, the piercing and riveting portion is furnished with an external keying wall, tapering from a driving and drawing edge formed on the external periphery of the free piercing portion end surface, towards the head, while a driving and drawing surface oriented approximately perpendicularly to the axis of the stud bolt extends between the cutting edge and the driving and drawing edge. From this there results for the piercing and riveting portion a form which especially facilitates the piercing operation.

The external keying wall can have a transition with a rounded portion into the bearing surface of the head. When the self-piercing stud bolt is being fitted, the riveting wedge outwardly radially deformed by the riveting operation into an L-shape can thus constitute together with the bearing surface of the head, a peripheral groove on the riveting wedge which snugly seats the surrounding panel material, whereby the rounded forms ensure that notch effects are avoided.

In a further embodiment, the recess is furnished with a bottom which is raised towards the axis of the stud bolt as a function of the thickness of the panel to be equipped with the stud bolt, or projects depressed into the recess. A bottom of raised form ensures that a slug of material that becomes domed in spherical form during punching out from a thin panel is radially expanded by the bottom and deformed to bear firmly against the inner wall of the recess, whereas by a depressed form of the bottom, in the case of a thick panel damage to the point of the counter-die, yet to be explained, as a result of the compression of the slug is avoided. The outer region of the bottom may be situated on approximtely the same radial plane as the bearing surface of the head.

In one special embodiment of the self-piercing stud bolt, a guiding and spacing step possessing a pressing surface facing towards the shank may be disposed in an axial extension of the shank on a pressing surface of the head facing towards the shank. This guiding and spacing step proves to be advantageous especially when a desired spacing is to be maintained between two panels. For this purpose, the shank of a stud bolt inserted according to this invention into a panel is guided through a preperforated second panel until this panel bears against the guiding and spacing step and subsequently the projecting portion of the shank is fixed to the second panel, for example riveted or screwed.

In further forms of embodiment, the self-piercing stud bolt of this invention may possess a substantially cylindrical shank and/or may furthermore be provided either with a substantially cylindrical or with a substantially polygonal guiding and spacing step and/or head and/or piercing portion. During the transporting of the stud bolt, for example in a guide of a piercing and riveting apparatus which inserts the stud bolt into a panel, the polygonal head and/or guiding and distance step are advantageously used as orientation aids during a sorting operation, while the polygonal piercing portion permits an especially non-rotating fixing to a panel.

In a preferred embodiment, the shank and/or the guiding and spacing step may possess an external thread, so that use as a self-piercing riveting bolt is possible. Furthermore, a stud bolt equipped preferably with guiding and spacing step may be suitable as a hinge connection, in that for example the shank of a stud bolt inserted into a panel is furnished only over a portion of the shank length with an external thread and a second panel possessing an opening is fixed rotatably movably to this shank portion, for example by means of nuts.

In the fixing of the stud bolt to a panel, the panel may be situated between a pressing die which holds the stud bolt and a female die with counter-hole die, and preferably be perforated simultaneously with the riveting operation. The pressing die contains preferably a seating for shank and/or guiding and spacing step, surrounded by a pressing surface. For example, the self-piercing stud bolt of this invention is inserted with its shank and/or guiding and spacing step into the seating, so that the pressing surfaces of the pressing die and stud bolt bear against each other, while the driving surface of the stud bolt bears against one side face of the panel oriented perpendicularly to the axis of the stud bolt.

In a preferred embodiment, the female die contains, in an extension of the axis of the stud bolt, an axial depression which is connected with the seating surface by a bending radius, and possesses a bottom approximately parallel to the seating surface and comprising a central bore; this bore then contains a cylindrical counter-hole die, which may possess an end penetrating into the depression of the female die. This end of the counter-hole die consists, for example, of a truncated conical splaying body, the base surface of which may be situated approximately at the level of the bottom of the depression. The splaying body extends preferably as far as a cylindrical cutting projection, which can be radially bounded at the free end face by a cutting edge. Preferably, the cutting projection has a diameter which is adapted to that of the recess of the stud bolt in such a manner that the cutting edges of the stud bolt and of the counter-hole die can co-operate in the perforating of the panel. On the free end face of the cutting projection, a splaying cone is centrally disposed, which may project beyond the plane of the female die seating surface and, when the stud bolt is being inserted into the panel, jams the trepanned slug of material in the recess in the piercing portion of the stud bolt.

Figure 1:
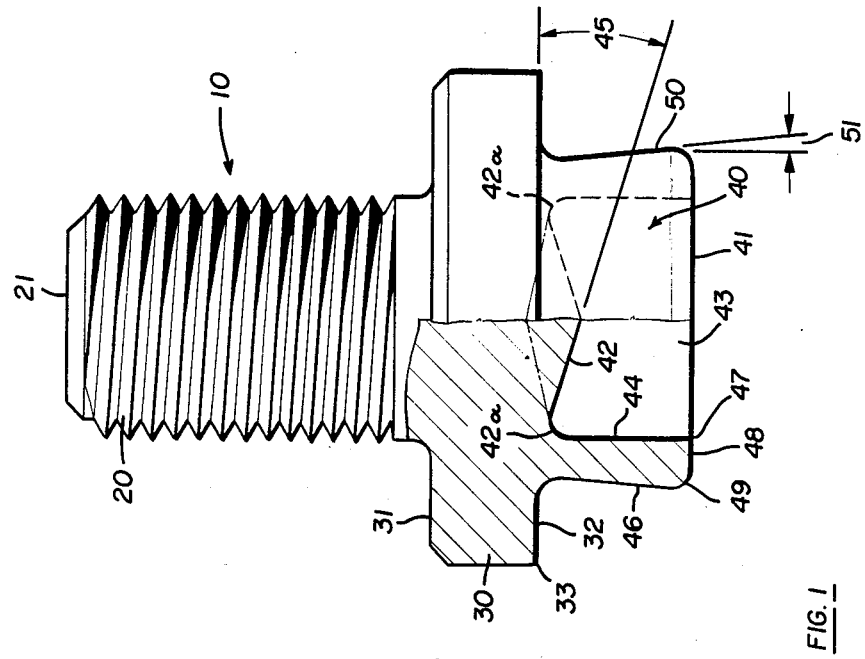
Figure 3:
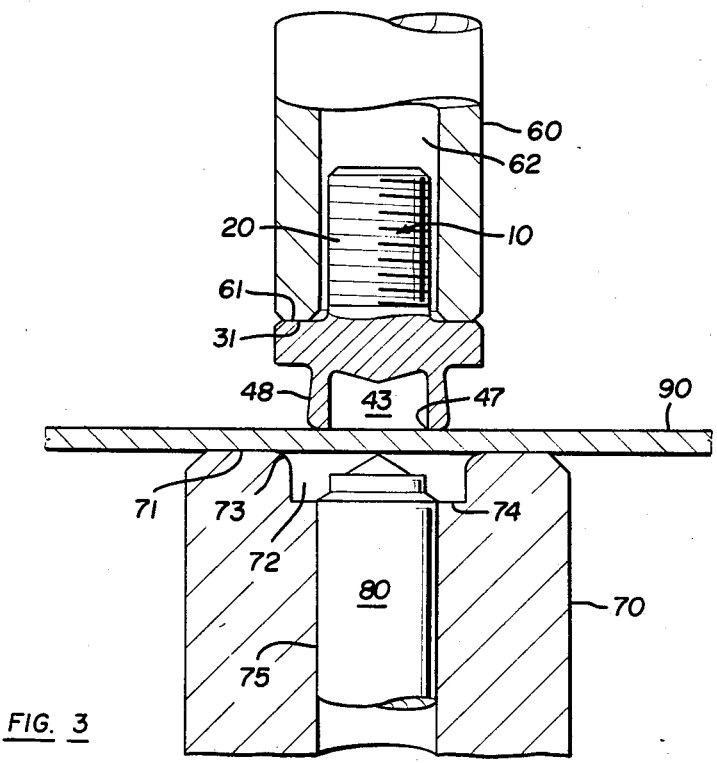
Figure 4:
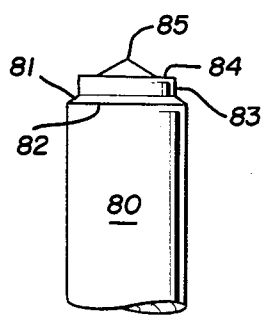

The invention is explained in more detail below with reference to examples of embodiment thereof illustrated in the drawings. The drawings show:

FIG. 1 a self-piercing stud bolt, in partly cut-away lateral view;

FIG. 2 another self-piercing stud bolt, constructed as a screw with guiding and spacing step;

FIG. 3 a partially cut away lateral view of the stud bolt of FIG. 1 and one form of embodiment of a piercing and riveting apparatus;

FIG. 4 a detail of the piercing and riveting apparatus of FIG. 3;

FIG. 5 the connecting element of FIG. 1 and the piercing and riveting apparatus of FIG. 3 in partially cut away lateral view for explaining the method according to this invention; and FIG. 6 the arrangement illustrated in FIG. 3 and 5 after the fitting of the stud bolt on a panel, in partly cut away lateral view.

The self-piercing stud bolt according to this invention is especially suitable for permanent fixing to a plate or panel, especially a metal sheet or the like; hereinafter, reference will be made only to a "panel" without any limiting meaning. The stud bolt and the piercing and riveting apparatus intended preferably for its processing are suitable especially also for use in a conventional press, in which the panel of formed. With each stroke of the press, a number of self-piercing stud bolts can then be connected to the panel.

FIG. 1 shows a self-piercing stud bolt, which is constructed as a self-piercing riveting bolt 10. This riveting bolt 10 consists essentially of a cylindrical shank 20, furnished with external thread, of a head 30 extending radially outwards at one end of the shank, and of a cyclindrical piercing and riveting portion 40, situated in an extension of the shank axis on the side of the head 30 remote from the shank 20.

In detail, the head 30 is situated on the end surface opposite to the free shank end 21 and is furnished on one side with a pressing surface 31, surrounding in annular manner the end surface, and on the other side with a bearing surface 32, surrounding in annular manner the piercing and riveting portion 40 and situated opposite to the pressing surface 31. The bearing surface 32 is radially bounded by a stamping edge 33. The piercing and riveting portion 40 possesses, in the free piercing portion end face 41, a central recess 43, tapering slightly conically to a bottom 42. The raised bottom 42 extends from the internal wall 44 of the recess 43 at an angle 45 obliquely towards the axis of the riveting bolt 10. The external region 42a of the conical bottom 42 and the bearing surface 32 lie approximately in the same plane. The dot-and-dash line illustrates the already mentioned recessed form of construction of the bottom for comparatively thick panels.

The recess 43 is surrounded by an annular riveting wall 46, which possesses, at the piercing portion end face 41, a cutting edge 47 which bounds the recess 43 and an annular driving and drawing surface 48. The driving and drawing surface 48 is oriented perpendicularly to the axis of the riveting bolt 10 and is connected with the external keying wall 50 by a rounded driving and drawing edge 49. The keying wall 50 tapers from the driving and drawing edge 49 towards the head with a clearance angle 51, relative to the axis of the riveting bolt 10, and leads with a rounded portion into the bearing surface 32 of the head 30.

A further embodiment of the self-piercing connecting element is illustrated as a self-piercing riveting screw 100 in FIG. 2 and differs from the above described riveting screw 10 in that a cyclindrical guiding and spacing step 125 is disposed on the axis of the riveting screw 100 between the end face of a shank 120, furnished with external thread, and a head 130. This guiding and spacing step 125 possesses a pressing surface 126, surrounding the end of the shank 120 in annular manner, and has a transition at a shoulder into an adjacent pressing surface 131 of the head 130.

The piercing and riveting apparatus according to FIG. 3 consists of a pressing die 60 and a female die 70 with counter-hole die 80. The pressing die 60, a component of a complex, automatic sorting out system, is furnished with a seating or recess 62 for the shank 20, surrounded by a pressing surface 61. A self-piercing riveting screw or riveting bolt 10 according to FIG. 1 is disposed with its shank 20 in the seating 62, so that the pressing surface 61 of the pressing die 60 and the pressing surface 31 of the riveting screw 10 bear against each other and the driving and drawing surface 48 of the riveting screw 10 bears against one side face of a panel 90.

This panel 90 is disposed perpendicularly to the axis of the riveting screw 10 and rests on the seating surface 71 of female die 70. The female die 70 contains, on the continued axis of the riveting screw 10, an axial depression 72, which is connected with the seating surface 71 by a bending radius 73. The depression 72 possesses a bottom 74, which extends parallel to seating surface 71 and is furnished with a central bore 75.

In this bore 75 there is situated a cylindrical counter-hole die 80. One end of the counter-hole die 80 penetrating into the depression 72 of female die 70 is illustrated in FIG. 4 and consists of a truncated conical splaying body 81, the base 82 of which is situated at approximately the level of the bottom 74 of depression 72 and which extends as far as a cylindrical cutting projection 83. This cutting projection 83 possesses a diameter adapted to the recess 43 of riveting screw 10 and is radially bounded at the free end face by a cutting edge 84, which co-operates with cutting edge 47 of riveting screw 10 when the panel 90 is being perforated. Furthermore, the cutting projection 83 possesses a central splaying cone 85 on its free end surface, which amongst other things ensures that during the first contact between self-piercing stud bolt, panel and counter-hole die, lateral relative movements are no longer possible.

An intermediate stage of the process of inserting a riveting screw 10 according to FIG. 2 by means of a piercing and riveting apparatus according to FIG. 3 into the panel 90 is illustrated in FIG. 5.

At the relative approach towards one another of pressing die 60 with the self-piercing riveting screw 10 on the one hand and the female die 70 with counter-hole die 80 and panel 90 on the other hand, the portion of the panel covering the depression 72 in the female die is deformed inwards by the driving and drawing surface 48 of the riveting screw 10 around the bending radius 73 into the depression 72 of female die 70. The panel 90 is then sheared between the cutting edge 47 of the riveting screw 10 and the cutting edge 84 of the counter-hole die 80 and thereby a slug 91, corresponding in diameter to the recess 43 of riveting screw 10, is punched or trepanned out from the panel 90. This slug 91, domed over the splaying cone 85 of the counter-hole die 80, is pushed during the further movement of splaying cone 85 into the conically tapering recess 43.

Furthermore, the riveting wall 46 of the riveting screw 10 is pressed against the (cylindrical) wall surface of the splaying body 81 on the counter-hole die 80 and is deformed radially outwards in L-shape onto the bottom 74 of the female die depression 72, so that the L-shaped riveting wall 46 forms, together with the bearing surface 32 of the head 30, a peripheral groove 52 on the riveting wall 46. Subsequently, the portion of the panel 90 deformed into the female die depression 72 is deformed inwards into this peripheral groove 52.

At the same time, the cut-out slug 91 according to FIG. 6 is pressed by the splaying cone 85 onto the conically raised bottom 42 of the recess 43 in the riveting screw 10. The splaying cone 85, like the bottom 42, is then pressed centrally into the slug 91 and the latter is consequently radially outwardly deformed and thus firmly jammed in the recess 43. FIG. 6 shows furthermore that the bearing surface 32 of the riveting screw 10 is pressed into the adjacent side of the panel 90. During this pressing-in, the riveted connection of the riveting wall 46 and the panel 90 is upset. The riveting wall 46 consequently lies between the externally bearing panel material 90 and the slug 91, jammed in the recess 43. The riveting screw 10 is thus firmly and especially non-rotatably mounted on the panel 90, without additional securing measures or special forming operations being required, whereby the time-saving fixing cycle, which requires only one operation, should be especially emphasized.

I claim:

1. A method of attaching a metal fastener to a generally planar metal panel, said metal fastener having an enlarged fastener head portion and a self-piercing riveting end portion, said self-piercing riveting end portion including a central recess enclosed by a self-riveting wall on opposed sides of said recess, the distal end of said wall having a internal piercing edge adjacent said recess, said recess termination in a bottom wall, the method comprising the following steps:

(a) locating said fastener adjacent a panel with said self-riveting wall distal end facing said panel and a die member located on the opposite side of said panel aligned with said fastener, (b) forcing said fastener toward said die member by engaging said enlarged portion, said wall piercing edge piercing a slug from said panel into said central recess, and (c) simultaneously plastically deforming said self-riveting wall distal end outwardly relative to said central recess, plastically deforming said panel slug against said bottom wall, thereby compressing said panel slug outwardly against the internal surface of said opposed sides of said wall, and plastically deforming the pierced edge of said panel from the plane of said panel toward said deformed wall distal end against the external surface of said self-riveting wall, and locking said deformed pierced panel edge between said fastener enlarged head portion and said outwardly deformed self-riveting wall distal end.

2. The method of attaching a metal fastener to a panel as defined in claim 1, wherein said die member includes a central die portion having a convex conical end portion, including compressing said panel slug between said bottom wall and said conical die end portion, thereby deforming said panel slug outwardly into engagement with said internal opposed sides of said self-riveting wall.

3. The method of attaching a metal fastener to a panel as defined in claim 1, wherein said self-riveting wall is cylindrical having a rounded distal outer edge, including deforming said distal wall edge radial portion outwardly forming an annular radial end portion.

4. The method of attaching a metal fastener to a panel as defined in claim 3, wherein said fastener includes a male threaded shank integral with said enlarged head portion and axially aligned with said central fastener recess, said enlarged head portion extending radially outwardly from said threaded shank and said cylindrical self-riveting wall and including an annular pressing surface adjacent said threaded shank, including engaging said pressing fastener head surface with an annular die received around said threaded shank thereby forcing said fastener into piercing engagement with said panel and forming the defined fastener and panel assembly having a male threaded shank extending therefrom.

5. A method of attaching a stud having a shank portion terminating in a self-piercing and riveting end portion to a generally planar metal panel, said stud end portion having an annular wall defining a recess, said recess having a bottom wall and an inner side wall defined by said annular wall, and said annular wall terminating in a distal end having a relatively sharp piercing end, the method comprising:

(a) locating said stud adjacent a panel with said stud annular wall distal end facing said panel and a die member located on the opposite side of said panel, generally aligned with said stud annular wall;

(b) piercing said panel with said stud annular wall piercing end forming a panel slug in said recess; and (c) simultaneously plastically deforming said self-riveting wall distal end outwardly relative to said recess plastically deforming the pierced edge of said panel from the plane of said panel toward said deformed wall distal end against the external surface of said annular wall forming a mechanical interlock, and plastically deforming said panel slug against said recess bottom wall in said stud.

6. The method of attaching a stud to a panel defined in claim 5, wherein said die member includes a central projecting die portion having a convex end portion, the method including disposing said central projecting die portion into said stud recesss, said convex die end portion deforming said panel slug into engagement with said recess inner side wall.

7. The method of attaching a stud to a panel as defined in claim 5, wherein said die member includes a convex rounded annular wall spaced from and adjacent said central die portion, said stud annular wall deforming said panel pierced edge against said die member annular wall forming said mechanical interlock.

8. The method of attaching a stud to a panel as defined in claim 5, wherein said panel has a thickness substantially less than the depth of said stud recess, the method including displacing said pierced panel slug from the plane of said panel and then deforming said slug, against said stud recess bottom wall and against said recess inner wall.

9. A method of attaching a metal fastener to a metal panel, said fastener having a self-piercing end portion including an annular projecting wall defining a recess, said recess having a bottom wall and an inner side wall defined by said annular wall, said annular wall terminating in a distal end having a relatively sharp piercing edge at said recess inner side wall, the thickness of said panel being substantially less than the depth of said fastener recess, the method comprising the following steps:
(a) locating said fastener adjacent said panel with said self-piercing end portion facing said panel and a die member located on the opposite side of said panel, said die member having a projecting die portion having a convex end portion coaxially aligned with said fastener recess;
(b) piercing said panel with said annular wall piercing edge forming a slug located on said projecting die portion in said fastener recess;
(c) displacing said panel slug from the plane of said panel to said fastener recess bottom wall, said die member convex end portion projecting into said recess and plastically deforming said panel slug against said recess bottom wall radially outwardly into engagement with said recess inner side wall; and
(d) plastically deforming said fastener annular wall distal end into locking engagement with the pierced edge of said panel.

10. The method of attaching a fastener to a generally planar panel as defined in claim 9, wherein said fastener annular wall distal end is deformed outwardly relative to said recess and said pierced panel edge is simultaneously plastically deformed from the plane of said panel toward said deformed annular wall distal end against the external surface of said annular wall, forming said locking engagement.

11. The method of attaching a metal fastener to a panel as defined in claim 9, wherein said fastener is a stud having a threaded shank portion integral with said self-piercing end portion, and said self-piercing end portion including a radially projecting flange portion, the method including engaging said flange portion with an annular die received around said threaded shank portion, thereby forcing said annular wall piercing edge to pierce said panel.

12. A method of rigidly attaching a stud to a generally planar metal panel, said stud having a shank portion and an integral tubular self-piercing and riveting end portion, said tubular end portion generally coaxially aligned with said shank portion and defining a recess, said recess having a bottom wall spaced from the distal end of said tubular end portion a distance greater than the thickness of said panel, the method comprising:
(a) locating said stud adjacent a panel with said tubular end portion facing said panel and a die member located on the opposite side of said panel, generally aligned with said tubular end portion;
(b) piercing said panel with said stud tubular end portion forming a panel slug in said recess; and
(c) simultaneously plastically deforming the distal end of said stud tubular end portion radially outwardly in said die with said panel slug located within said recess in said fastener tubular end portion supporting said fastener tubular portion during said deformation thereof member, and plastically deforming the pierced edge of said panel from the plane of said panel toward said deformed stud tubular distal end against the outer surface of said stud tubular end portion forming a tubular panel portion in interlocking engagement with said stud tubular portion.

13. The method of rigidly attaching a stud to a panel as defined in claim 12, wherein said stud includes a flange portion projecting radially between said shank and tubular end portions, said tubular panel portion being locked between said stud flange portion and said deformed tubular distal end portion.

14. The method of rigidly attaching a stud to a panel as defined in claim 12, wherein said die member includes a projecting portion which is telescopically receivable within said stud recess, the method including displacing said panel slug into said recess on said projecting die portion and plastically deforming radially said panel slug against said recessed bottom wall to engage the inner wall of said recess.

15. A method of attaching a metal fastener to a metal panel, said fastener having a fastener head portion and a tubular self-piercing and riveting end portion having an inner distal piercing edge, the method comprising the following steps:
locating said fastener adjacent a panel with said tubular self-piercing and riveting end portion facing said panel and a die member located on the opposite side of said panel, said die member including a central projecting portion having a generally conical end portion surrounded by an annular recess, said projecting die portion aligned with the opening of said fastener tubular end portion and telescopically receivable therein,
forcing said fastener towards said die member, said tubular fastener end portion piercing edge piercing a slug from said panel, said projecting conical die end portion centering and supporting said panel slug and displacing said panel slug into said fastener tubular end portion,
said fastener tubular end portion deforming the pierced panel edge into said die member annular recess against the exterior surface of said fastener tubular end portion, and
plastically deforming the distal end of said fastener tubular end portion radially outwardly against a bottom wall of said die member annular recess, thereby interlocking said fastener tubular portion deformed distal end and said deformed pierced panel edge, said panel slug located within said fastener tubular portion on said projecting die portion and supporting said fastener tubular end portion during said deformation.

16. The method of attaching a fastener to a generally planar panel as defined in claim 15, wherein the outer distal edge of said fastener tubular end portion is radiused and the outer edge of said die cavity is radiused and convex a greater internal diameter than the external diameter of said tubular fastener portion, and wherein said method includes first plastically deforming said panel into said annular cavity, displacing a panel portion from the plane of said panel, said panel being deformed around said convex outer cavity edge against said convex fastener distal end portion, then piercing said panel with said inner distal tubular piercing edge.

17. The method of attaching a fastener to a panel as defined in claim 15, wherein said fastener head portion has a greater diameter than said fastener tubular end portion, said fastener head portion including a clamping edge adjacent and generally perpendicular to said tubular end portion, wherein said method includes depressing said clamping edge against said panel, displacing an annular portion of said panel into said die cavity, said pierced panel edge being deformed into an L-shaped portion entrapped between said fastener clamping edge and said radially outwardly deformed tubular distal end.

* * * * *